(12) United States Patent
Altena

(10) Patent No.: US 6,808,240 B2
(45) Date of Patent: Oct. 26, 2004

(54) SWITCH CABINET FRAME STRUCTURE

(75) Inventor: Heine Altena, Ryswyk (NL)

(73) Assignee: ISE Innomotive Systems Europe GmbH (DE)

( * ) Notice: Subject to any disclaimer, the term of this patent is extended or adjusted under 35 U.S.C. 154(b) by 154 days.

(21) Appl. No.: 10/199,350

(22) Filed: Jul. 19, 2002

(65) Prior Publication Data
US 2003/0048048 A1 Mar. 13, 2003

(30) Foreign Application Priority Data
Jul. 27, 2001 (DE) .......................................... 101 36 681

(51) Int. Cl.⁷ .............................................. A47G 29/00
(52) U.S. Cl. ............................... 312/265.4; 312/265.1; 312/223.1; 312/265.2
(58) Field of Search ......................... 52/737.1, 738.1, 52/730.1, 703.6, 735.1, 731.7, 732.2, 730.6; 174/52.1, 35 R; 312/26, 265.1, 265.2, 265.3, 223.1, 265.4, 265.5, 223.6, 223.2; 361/605; 211/26

(56) References Cited

U.S. PATENT DOCUMENTS

| | | | | |
|---|---|---|---|---|
| 2,131,115 A | * | 9/1938 | Naisuler | 428/657 |
| 3,282,016 A | * | 11/1966 | Jacques | 52/731.8 |
| 3,483,998 A | * | 12/1969 | Butler | 211/189 |
| 3,538,658 A | * | 11/1970 | Lavalley et al. | 52/232 |
| 4,490,958 A | * | 1/1985 | Lowe | 52/634 |
| 4,643,319 A | | 2/1987 | Debus et al. | |
| 5,483,777 A | * | 1/1996 | Menchetti et al. | 52/481.1 |
| 5,535,569 A | * | 7/1996 | Seccombe et al. | 52/634 |
| 5,806,946 A | * | 9/1998 | Benner et al. | 312/265.3 |
| 5,971,511 A | * | 10/1999 | Diebel et al. | 312/265.3 |
| 5,992,646 A | * | 11/1999 | Benner et al. | 211/26 |
| 6,138,843 A | * | 10/2000 | Nicolai et al. | 211/26 |
| 6,155,658 A | * | 12/2000 | Woodward et al. | 312/204 |
| 6,206,211 B1 | * | 3/2001 | Nicolai et al. | 211/183 |
| 6,231,142 B1 | * | 5/2001 | Pochet | 312/265.3 |
| 6,273,533 B1 | * | 8/2001 | Nicolai et al. | 312/265.1 |
| 2002/0100737 A1 | * | 8/2002 | Walter et al. | 211/26 |

FOREIGN PATENT DOCUMENTS

| | | | | |
|---|---|---|---|---|
| DE | 3344598 C1 | * | 9/1984 | H02B/1/02 |
| DE | 4036664 A1 | * | 5/1992 | A47B/96/00 |
| EP | 751595 A2 | * | 1/1997 | H02B/1/30 |

* cited by examiner

Primary Examiner—Peter M. Cuomo
Assistant Examiner—Erika Garrett
(74) Attorney, Agent, or Firm—Armstrong Teasdale LLP

(57) ABSTRACT

A frame structure for a switch cabinet includes at least four vertically extending rail profiles arranged in edges. At least one of the vertical rail profiles includes a cross section formed by a plurality of bent profile webs, the cross section of an envelope of at least one rail profile being configured to be rectangular. The at least one vertical rail profile is configured to be open, and at least one profile web extends longer than an edge length of the rectangle formed by the envelope and is double-walled.

29 Claims, 9 Drawing Sheets

SWITCH CABINET FRAME STRUCTURE

CROSS REFERENCE TO RELATED APPLICATIONS

This application claims the benefit of German Patent Application No. 101 36 681.7 filed Jul. 27, 2001.

BACKGROUND OF THE INVENTION

This invention relates generally to frame structures, and, more particularly, to frame structures for switch cabinets.

A corresponding frame structure is known from DE 198 53 611. The frame structure consists of a plurality of interconnected frame profiles, each frame profile being designed as a hollow profile and subdivided into a first side surface area assigned to the interior of the switch cabinet and into a second side surface area oriented away from the interior of the switch cabinet. The second side surface area is completely closed towards the interior of the switch cabinet, and cover elements can be mounted on laterally projecting fastening webs which are equipped with rows of holes and provided on the second side surface area. A fixation is thereby possible without the creation of a passage to the interior of the switch cabinet, so that sealing is simplified.

Furthermore, a similar frame structure consisting of individual rail profiles or frame profiles, respectively, is described in DE 33 44 598. The frame structure known therefrom for a switch cabinet consists of at least twelve interconnected frame structure legs of the same hollow profile. The hollow profile is here provided with rows of holes and has a substantially square cross-section. In an extension of the associated square hollow profile sides, there are formed profile legs which on the outsides form outwardly projecting frame-like sealing or abutment webs. The various elements arranged on the outside are mounted on the hollow profile by means of screws which are slid through openings on the inside of the hollow profile and arranged with their heads in the interior of the profile. To this end, the profile leg comprises recesses at specific places for positioning connection sleeves of the cover elements. The openings for passing the screws therethrough are, however, fixedly predetermined at specific places only because a sealing is required at each of said places.

Another frame structure consisting of profile bars is described in DE 40 36 664. The tubularly closed hollow profiles are here equipped with an L-shaped wall section directed towards the interior of the switch cabinet and with a wall section which is directed to the outside and stepped in W-shaped configuration. Flanges are provided at the points of intersection of the two wall sections, one of the flanges being supplemented by a double-laid web. Both in its inner wall area and in its outer wall area, the hollow profile is provided with penetrations or holes with which different elements can be fastened.

All of the known profile bars have in common that these are hollow profiles. The hollow profile is needed to give the assembled frame structure the necessary dimensional stability. This is particularly necessary for building up a cabinet, in particular a switch cabinet, because walls, ceilings, floors and doors or flaps can be anchored in a reliable and stable manner to the hollow profiles. However, it has turned out to be a disadvantage that it is not easily possible to fix more than two rod-like carrier elements to each of the profile bars within the frame structure in one and the same installation plane. Furthermore, the individual profile bars are very heavy, thereby contributing considerably to the overall weight of the switch cabinet.

In this respect profile bars that are configured to be open in cross section would be usable in a much more flexible way because these offer more possibilities of accommodating something. One shortcoming of such open profile sections is however that they have a relatively small dimensional stability due to their half-open cross-sectional configuration over their entire length. This is in particular disadvantageous when the frame structures are to be built into cabinets by mounting additional walls, ceilings, floors, doors or flaps because the stability of the profile bars is not sufficient.

BRIEF DESCRIPTION OF THE INVENTION

In one aspect, a frame structure for a switch cabinet is provided. The frame structure comprises at least four vertically extending rail profiles arranged in edges. At least one of said vertical rail profiles comprises a cross section formed by a plurality of bent profile webs, and the cross section of an envelope of the at least one rail profile is configured to be rectangular. The at least one vertical rail profile is configured to be open, and at least one profile web extends longer than an edge length of the rectangle formed by said envelope and is double-walled.

The frame structure provides for an open profile of an adequate stiffness comparable to the stability of closed profiles. Adequate stiffness is ensured by the double-walled profile web which is arranged in the interior of the rail profile and which in comparison with the other existing profile rods is configured to be particularly long and stable. A flexible installation of the most different assembly elements in the interior of the switch cabinet is thereby ensured together with a high dimensional stability of the open rail profiles. The frame structure may be inexpensively manufactured and assembly is simplified.

DETAILED DESCRIPTION OF THE INVENTION

Figure 1:
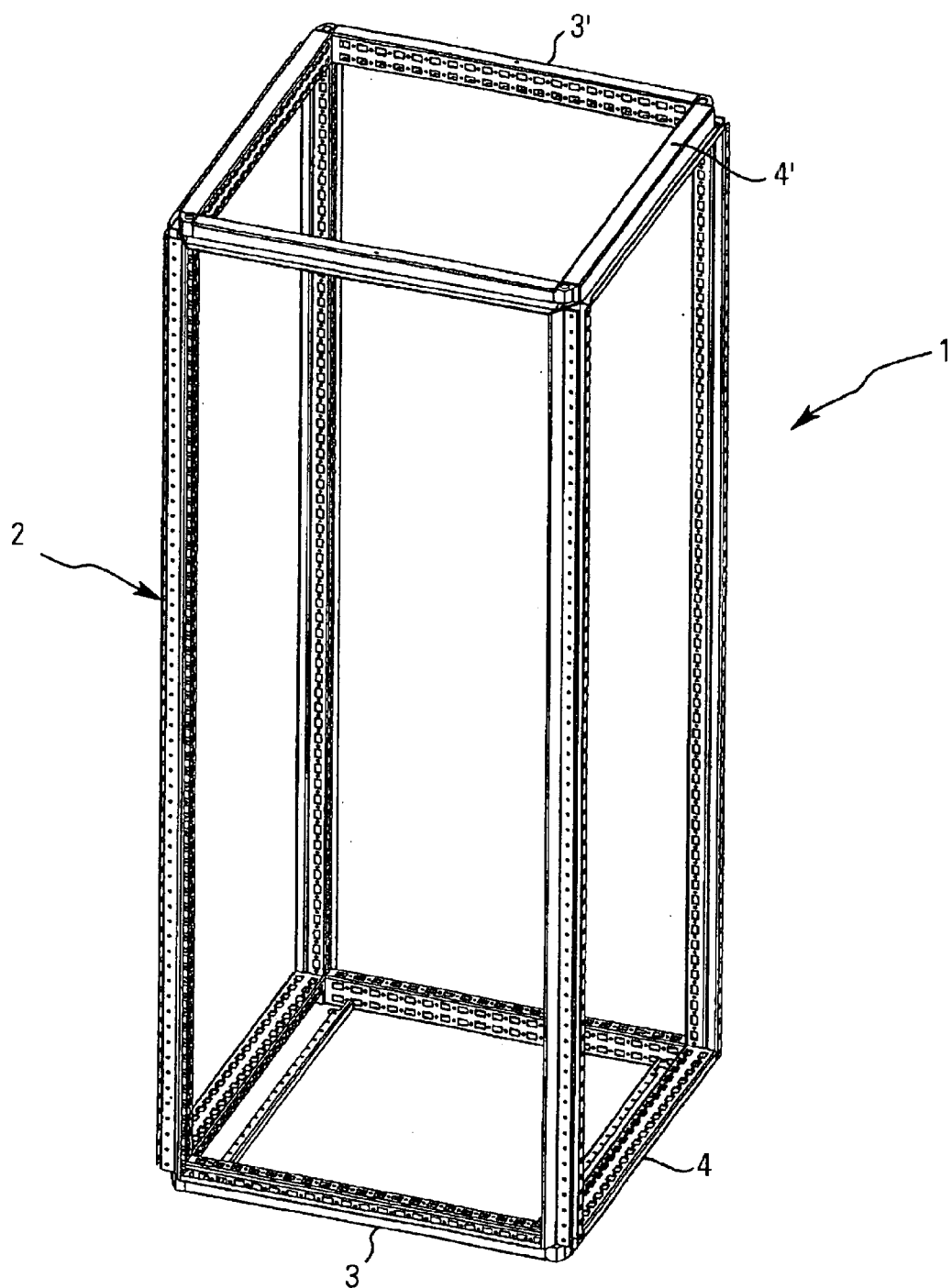
FIG. 1 is a perspective view of the frame structure of a switch cabinet.

FIG. 1 illustrates an exemplary embodiment of a frame structure 1 of, for example, a switch cabinet. As explained in detail below, frame structure 1 provides a frame structure having the stability of closed profiles, but also the flexibility of open profiles. While the present invention has been found particularly advantageous for construction of switch cabinets, it is contemplated that the benefits of the invention may be realized in other applications as well. The following description, therefore, is set forth for purposes of illustration rather than by way of limitation.

Frame structure 1 includes twelve interconnected rail profiles, namely four vertical profiles 2, four horizontal profiles 3, 3' and four transverse profiles 4, 4'. The cross sections of the vertical profiles 2 are each substantially identical, whereas the cross sections of the horizontal profiles 3, 3' and transverse profiles 4, 4' are designed to differ from one another. Further, in an exemplary embodiment, the cross sections of the horizontal profiles 3, 3' also differ from one another and the transverse profiles 4, 4' are different in comparison with each other, irrespective of whether they are arranged on the bottom of the frame structure or on the ceiling.

All of the rail profiles 2, 3, 4 are designed as open profiles which are produced, for example, by roll forming from a steel sheet. In use, different elements, including but not limited to a door, lateral cover elements, as well as a bottom and a cover, can be mounted on the outer portions of the individual rail profiles 2, 3, 4. For this purpose, profile rails 2, 3, 4 are longitudinally equipped with rows of holes or openings therethrough in various areas. However, it is equally possible to vary the interior of the frame structure in any desired way by inserting mounting plates or carrier elements. To this end, rows of holes or openings are also provided on the profile webs of rail profiles 2, 3, 4 facing the interior of the switch cabinet.

Figure 2:
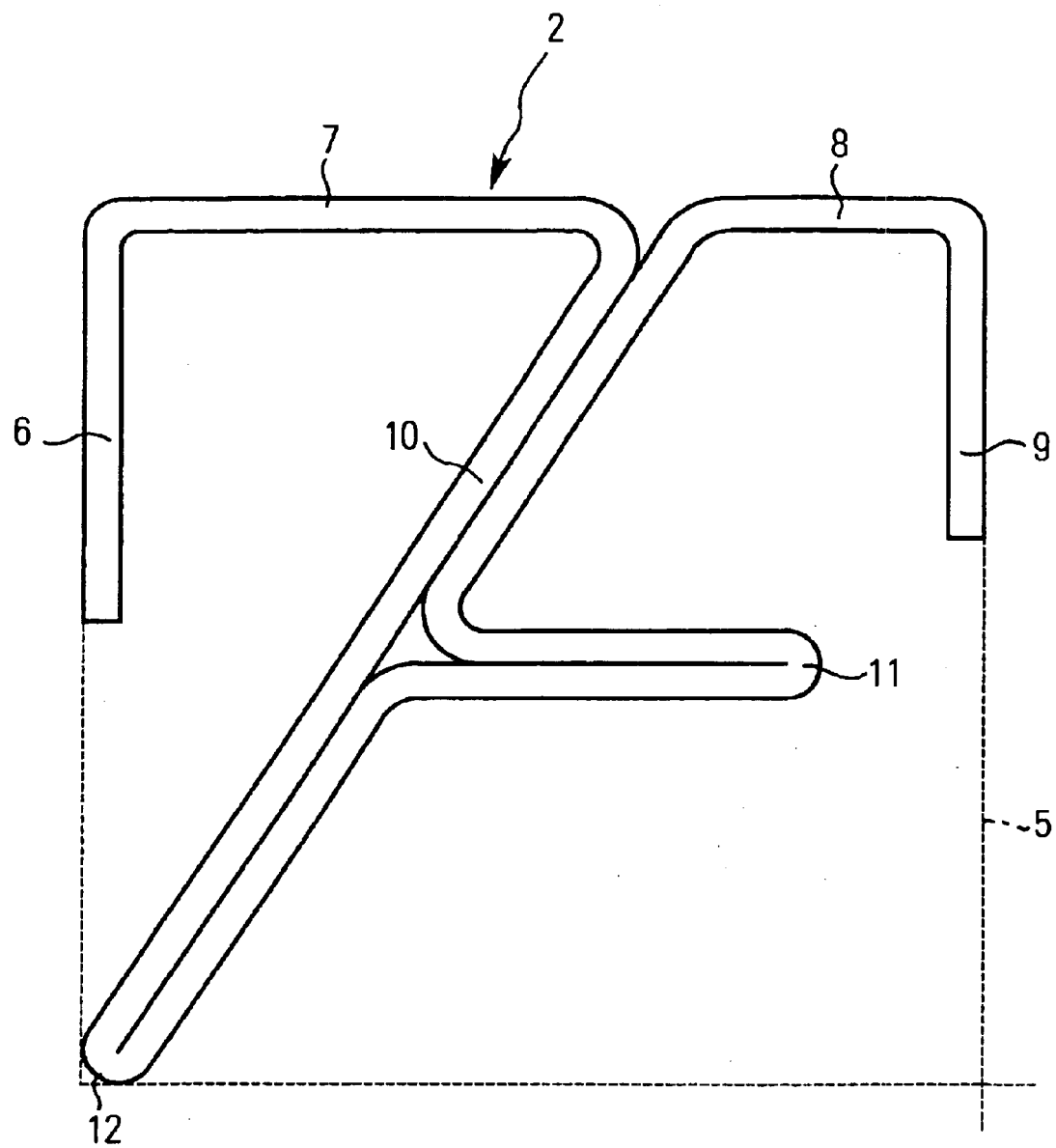
FIG. 2 is a top view of a vertical profile of the frame structure shown in FIG. 1.

With reference to FIG. 2, the cross section of an exemplary vertical profile 2 shall now be explained in more detail. The outer shape of the vertical profile is defined by a rectangle, and in one embodiment a square, formed by an envelope 5. Advantageously, the formation of the rail profiles with a square cross-section envelope provides the same contact and abutment surface at all sides. This further simplifies production and assembly.

A profile web 6 and 7 are arranged in a substantially perpendicular fashion relative to each other and interconnected to form an angle. Advantageously, the angle enclosed by the profile webs is about 90°. In particular with respect to the envelope which is of a rectangular design when viewed in cross section, profile webs 6, 7 can each form the edges of the rail profile and coincide in a partial section with the envelope 5. In the illustrated embodiment, profile webs 6 and 7 are aligned on the square formed by the envelope 5 such that they form part of a wall of vertical profile 2. Profile webs 6 and 7 are arranged in the mounted state in the interior of the switch cabinet and form an inner edge thereof.

In an exemplary embodiment profile web 6 facing the interior of the switch cabinet may be in cross section about half as long as the corresponding edge length of the rectangle formed by the envelope 5. In practice, this dimension has turned out to be particularly suited on the one hand with respect to stability and on the other hand with respect to the contact surface made available for fastening purposes.

Directly next to profile web 7, i.e. arranged in a line relative thereto, a profile web 8 is provided that is arranged in a direction substantially perpendicular to a profile web 9 and connected thereto under formation of an angle. Consequently, profile webs 6 and 9 extend substantially parallel with each other. Profile webs 8 and 9 are here also aligned with the square formed by the envelope 5, and the angle enclosed by them forms an edge of vertical profile 2. In one embodiment, a length of profile web 9 facing away from the interior of the switch cabinet may be smaller in cross section than half an edge length of the rectangle formed by the envelope 5. In a further embodiment, the length of profile web 9 facing away from the interior of the switch cabinet may be in cross section about ⅓ of the edge length of the rectangle formed by the envelope 5.

Furthermore, in the illustrated embodiment, profile webs 7 and 8 are arranged relative to one another such that they form partial sections of the same side wall of vertical profile 2, and profile web 7 when viewed in cross section is about twice as long as profile web 8 in an exemplary embodiment. Profile webs 6, 7 that are positioned relative to each other at an angle and form an edge of the rail profile assigned to the interior of the switch cabinet, and two profile webs 8, 9 that are positioned at an angle relative to each other and form an edge of the rail profile facing away from the interior of the switch cabinet is believed to enhance stability of vertical profile rail 2.

In addition, the angles enclosed by profile webs 6, 7, 8, 9 form, when viewed in cross section, neighboring corners of the rectangle formed by the envelope 5, and each profile web 8, 9 enclose an angle forming a section of the same side wall of the vertical rail profile 2. This has the advantage that, although an open rail profile is formed on the remaining sides of the envelope 5, a complete side wall is made available. This, in turn, has a positive effect on the stability of the whole frame structure 1 (shown in FIG. 1).

The two profile webs 7 and 8 are separated from one another by a double-walled profile web 10 which extends between profile webs 7 and 8. Both profile web 7 and profile web 8 are here connected to a different wall of double-walled profile web 10. Double-walled profile web 10 extends obliquely in an interior of the square formed by the envelope 5 up to the corner of the square which is next to the corner formed between profile webs 6 and 7. Consequently, double-walled profile web 10 extends over the whole length of the profile web 7 downwards, and in an exemplary embodiment double-walled profile web 10 extends at an angle of about 60° relative to the profile web 7. Double-walled profile web 10 in the illustrated embodiment is longer than an edge length of the square formed by the envelope 5. High stability between the side wall formed by profile webs 7, 8 and double-walled profile web 10 and thus for the whole vertical profile 2 is achieved.

It may turn out to be of particular advantage when a length of double-walled profile web 10 is greater, when viewed in cross section, than the longest rectangular side of the envelope 5 (shown in FIG. 2). A sufficient dimensional stability of the individual profile web and thus of the whole frame structure is thereby ensured because double-walled profile web 10 serves as a supporting element of the vertical profile 2.

As double-walled profile web 10 viewed in cross section extends between the side wall formed by profile webs 7, 8 up to a corner of the rectangle which is formed by envelope 5 and which is in the vicinity of a corner facing the interior of the switch cabinet, double-walled profile web 10 serves as a point of contact extending over the whole length of vertical rail profile 2. Since double-walled profile web 10 extends up to the rectangle formed by the envelope 5, additional stability is again imparted to the total profile.

Profile webs 6 and 7 and double-walled profile web 10 form an open channel which is accessible from the interior of the switch cabinet and which can be used, for example, as an integrated cable compartment. The cables (not shown) are thereby protected, e.g. during installation of mounting plates, so that assembly is here simplified.

Double-walled profile web 10 is formed in an exemplary embodiment by folding two wall sections onto each other such that a fold edge 12 simultaneously forms an edge of vertical profile 2, as well as a corner of the square formed by the envelope 5. Consequently, a simplified and inexpensive manufacture of rail profiles is provided. In an alternative embodiment rail profiles 2 may be integrally made from sectional steel. This permits a more inexpensive production, e.g. by shaping, such as rolling or cold rolling.

In an alternative embodiment, and in lieu of the above described integrally formed double wall 10, double-wall 10 can be connected in the area of the side wall to profile webs 7, 8 forming the side wall, so that double-walled profile web 10 extends between the profile webs forming the side wall.

Vertical profile 2 is subdivided by double-walled profile web 10 into an area facing an interior of the switch cabinet, including profile webs 6 and 7, and an area facing away from the interior of the switch cabinet, including profile webs 8 and 9. Profile web 9 extends in parallel with a side wall to be fastened thereto. It is possible with the clear separation created thereby between a rail profile section facing the interior of the switch cabinet and a section assigned to the exterior of the switch cabinet to achieve a clear distinction with respect to the fastening of the individual elements. For instance, the outer elements are mounted on another section than the inner elements. This may be of particular advantage, for example, to sealing required of a switch cabinet because penetrations towards the interior of the switch cabinet are not necessary due to the mounting of the outer plates. Double-walled profile web 10 completely separates the two sections.

Furthermore, a fastening web 11 is formed in an illustrative embodiment at a side of double-walled profile web 10 which faces profile webs 8 and 9. Fastening web 11 extends substantially parallel with profile web 8 and is longer than profile web 8, but spaced by a predetermined measure from the square formed by the envelope 5. In an exemplary embodiment, fastening web 11 is also double-walled, and in one embodiment is formed by folding two wall sections onto each other. More specifically, in one embodiment fastening web 11 is formed integrally with double-walled profile web 10 and is produced by bending and laying on top of each other a wall of the profile web 11 that is oriented away from the interior of the switch cabinet. Laterally projecting fastening web 11 facilitates fastening of cover elements and the like in an easy way to vertical profile 2 without sealing problems created by holes therein. This additionally enhances the flexibility of vertical profile 2 and facilitates fastening and fixing of outer cover elements in a very easily accessible way. Outer cover elements can therefore be exchanged easily and without great efforts.

According to a further embodiment lateral fastening web 11 may be made longer, when viewed in cross section, than the shorter one of profile webs 7, 8 forming the side wall and shorter than the longer profile web. It is thereby ensured that the lateral fastening web 11 in its size ratio remains within the rectangle formed by the envelope 5, so that cover elements can be fastened to the outer profile web independently of the fastening web.

When viewed in cross section, profile webs 8 and 9 are designed with about the same length and thus with about 1/3 of the edge length of the square formed by the envelope 5.

Further, profile webs 7, 8 forming the side wall have a length ratio of about 2/1 in cross section such that double-walled profile web 10 is as long as possible while providing enough contact surface for fastening further elements to the profile. The ratio of 2/1 has here turned out to be particularly suited in practice. In an exemplary embodiment, length ratios of fastening web 11 and of profile web 8 and profile web 9, respectively, have been further chosen with respect to one another such that an opening is created between the fastening web 11 and the profile web 9, with elements being insertable into said opening. Consequently, an outwardly open channel is formed between profile webs 8, 9, 10 and fastening web 11.

As illustrated in FIG. 2, it is noted that profile webs 6, 7, 8 and 9 as well as the fold edge 12 of double-walled profile web 10 extend each on the square formed by the envelope 5 in an exemplary embodiment.

In use, vertical profile 2 is oriented such that profile webs 6 and 7 face the interior of the switch cabinet, whereas profile webs 8 and 9 face the exterior of the switch cabinet. Vertical profile 2 provides for an open profile of an adequate stiffness comparable to the stability of closed profiles. Adequate stiffness is ensured by double-walled profile web 10 which is arranged in the interior of the rail profile and which in comparison with existing profile rods is configured to be particularly long and stable. A flexible installation of different assembly elements, explained below, in the interior of the switch cabinet is thereby ensured together with a high dimensional stability of the open rail profiles.

Figure 3:
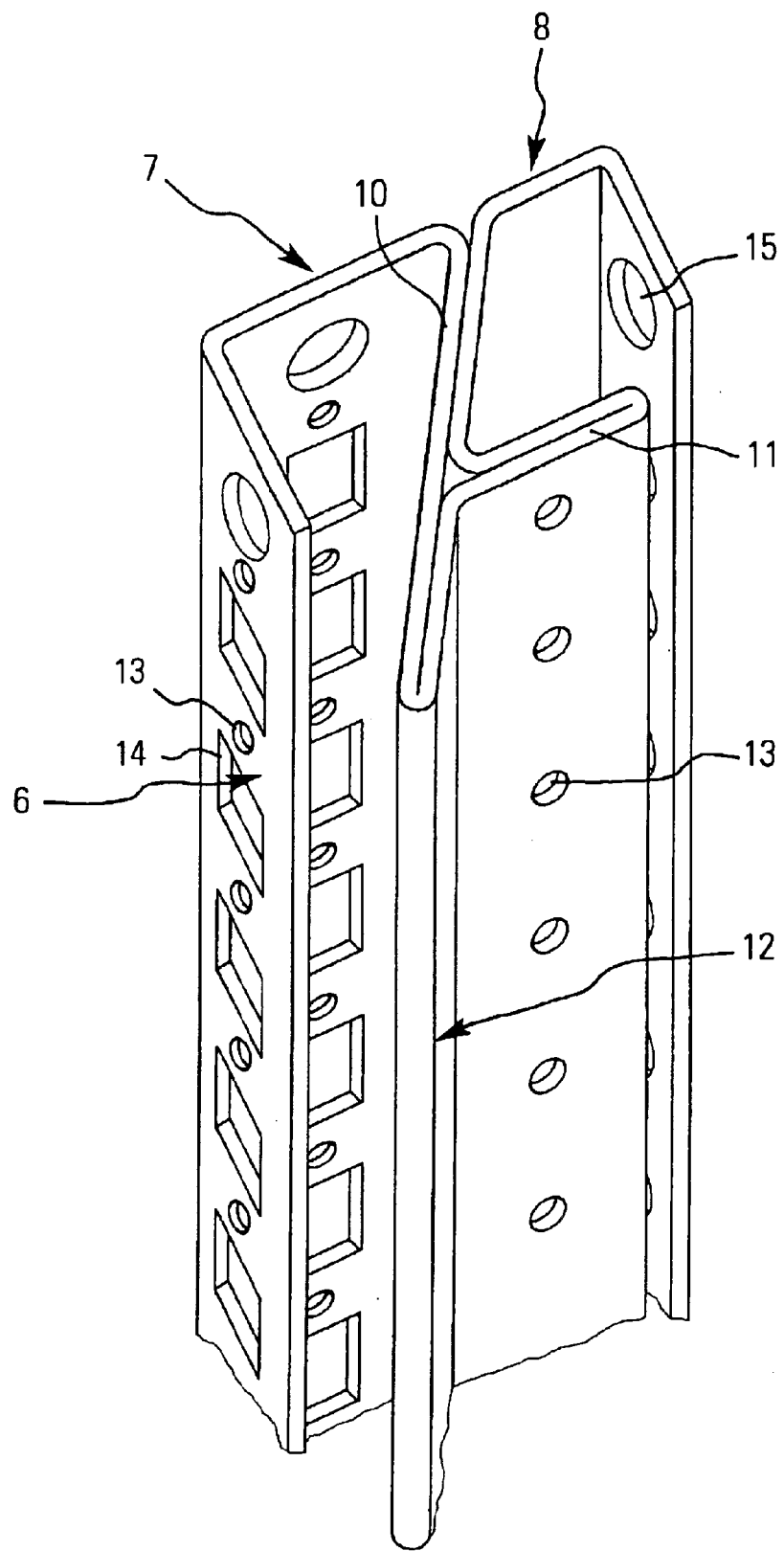
FIG. 3 is a three-dimensional view of the vertical profile of the frame structure shown in FIG. 1.

For mounting various elements on the inside and on the outside of vertical profile 2, profile webs 6, 7 and 9 as well as the fastening web 11 are each provided with a row of openings or holes 13, 14, and 15 therethrough as illustrated in FIG. 3. Profile webs 6 and 7 which are oriented towards the interior of the switch cabinet are each provided with a row of holes which alternately include square holes 14 and small round holes 13. The holes are arranged at regular intervals relative to one another and extend longitudinally over each profile web 6, 7 in its entirety. A flexible mounting of the most different elements is therefore made possible by providing different rows of holes without the final consumers being forced to drill holes. At the same time, this ensures the internal sealing of the switch cabinet and facilitates assembly. Profile web 9 is also provided with a row of holes extending over the whole length, the holes including individual round holes 15 in an exemplary embodiment. Furthermore, fastening web 11 is provided with a row of holes including smaller holes 13, and holes 13 in an exemplary embodiment extend through both wall sections of double-walled fastening web 11.

It is noted that double-walled profile web 10 in an exemplary embodiment does not have a row of holes or openings therethrough, so that no connection is established between the area facing the interior of the switch cabinet and the area facing away therefrom. Also, no holes are provided in the double-walled profile web so as to ensure the sealing of the interior of the switch cabinet.

Figure 4:
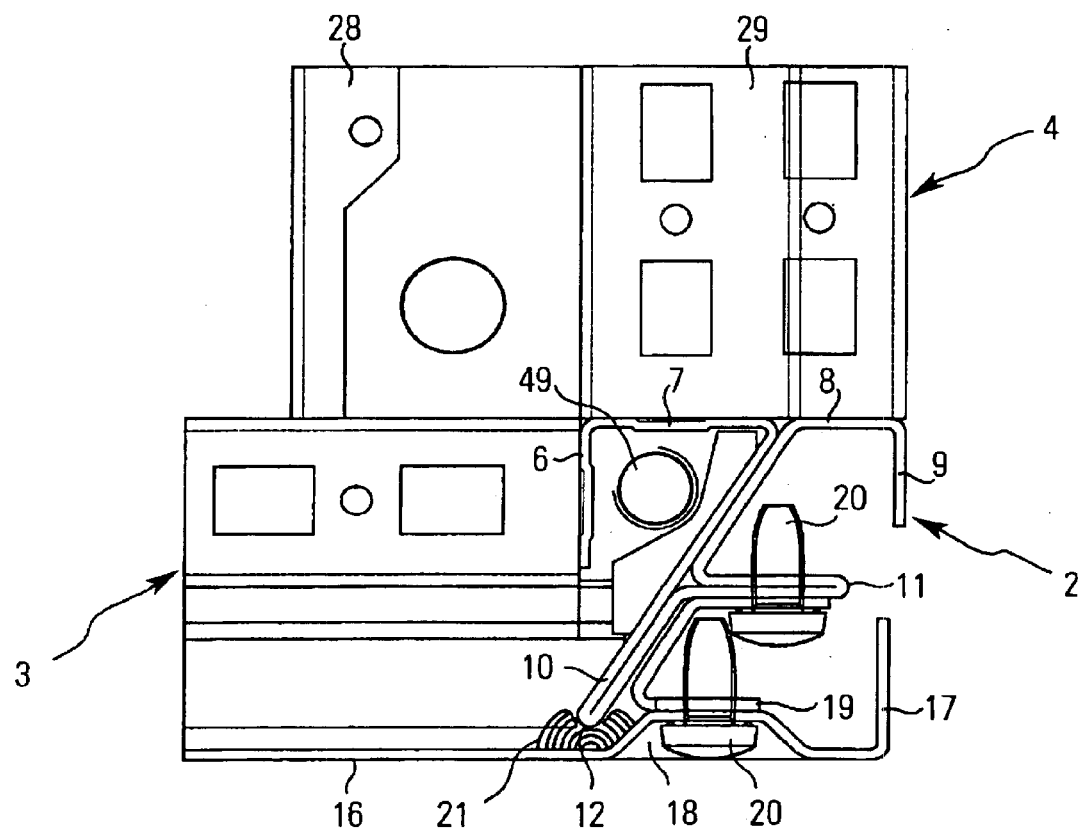
FIG. 4 is a partial cross-sectional view showing a corner of the frame structure shown in FIG. 1.

FIG. 4 illustrates a connection of an exemplary rear wall 16 to the vertical profile 2. Rear wall 16 is includes at both sides with an edge 17 that is bent inwards, i.e. towards the switch cabinet, and arranged in the mounted state approximately in an extension of profile web 9. Furthermore, rear wall 16 includes at both sides a groove 18 which extends longitudinally in a lateral edge portion and which has been formed by folding the metal sheet forming rear wall 16. An exemplary fastening element 19 which, when viewed in cross-section, has the shape of a distorted U-profile oriented to the outside, i.e. away from the interior of the switch cabinet, is arranged between an inside of groove 18 and a side of fastening web 11 facing away from profile web 8.

When viewed in cross section, fastening element 19 is here particularly designed such that two adjoining surfaces directly extend in contact with double-walled fastening web 11 and an adjoining section of double-walled profile web 10. A second side wall of fastening element 19 extends in parallel with a bottom portion of groove 18. Fastening element 19 is secured by means of two screws or rivets 20 to rear wall 16 in the area of groove 18 on the one hand and to fastening web 11 on the other hand.

To ensure a complete sealing of the interior of the switch cabinet, an area of the fold edge 12 of double-walled profile web 10 has arranged therein a seal 21 which extends over the whole length and runs between fold edge 12 and rear wall 16.

Figure 5:
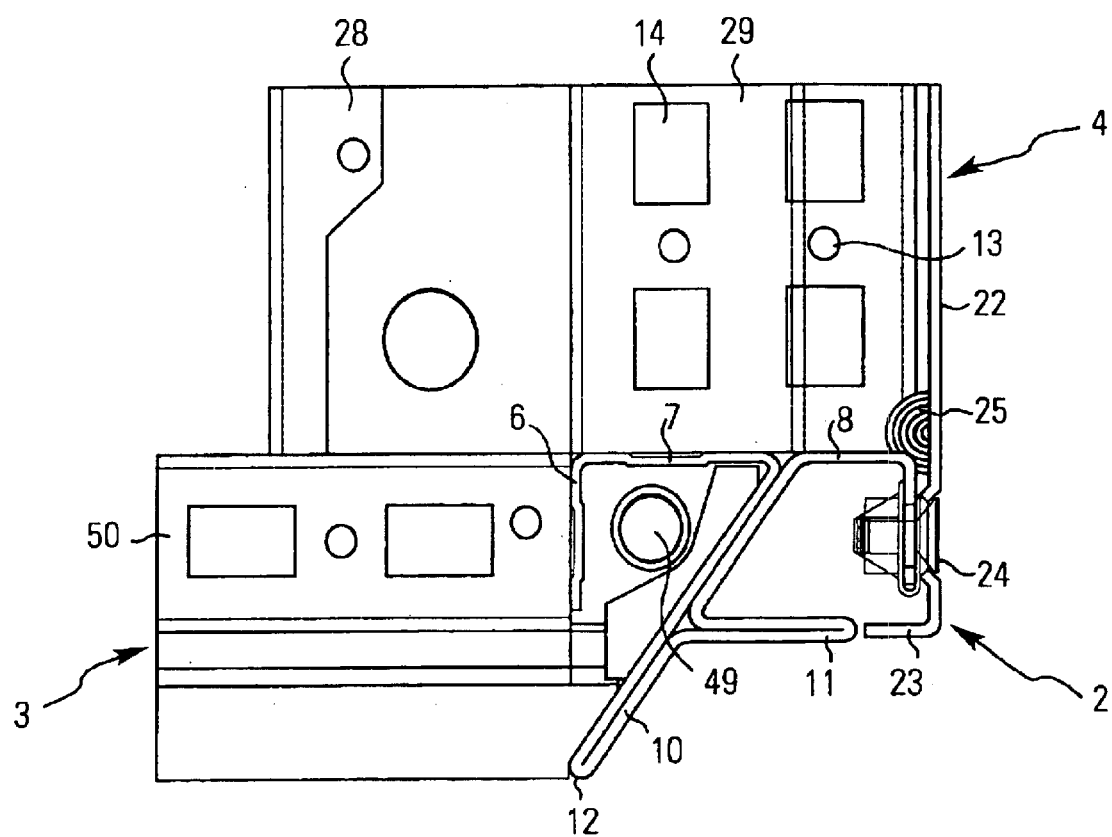
FIG. 5 is another partial cross-sectional view of the corner portion of the frame structure shown in FIG. 4.

FIG. 5 illustrates a connection of a side wall element 22 to a vertical profile 2 in cross section. Side wall element 22 includes an inwardly bent edge 23 which is exactly arranged in extension of the fastening web 11 in an exemplary embodiment. As can also be seen in FIG. 5, side wall element 22 includes an opening 24 for a countersunk head screw which is in alignment with an opening 15 in profile web 9. Moreover, a seal 25 is provided between side wall element 22 and vertical profile 2 in an area of the edge formed by profile webs 8 and 9, the seal 25 extending longitudinally along vertical profile 2 and serving to seal the interior of the switch cabinet.

Furthermore, FIG. 5 illustrates a cable 49 arranged in a compartment formed between profile webs 6, 7 and double-walled profile web 10.

Figure 6:
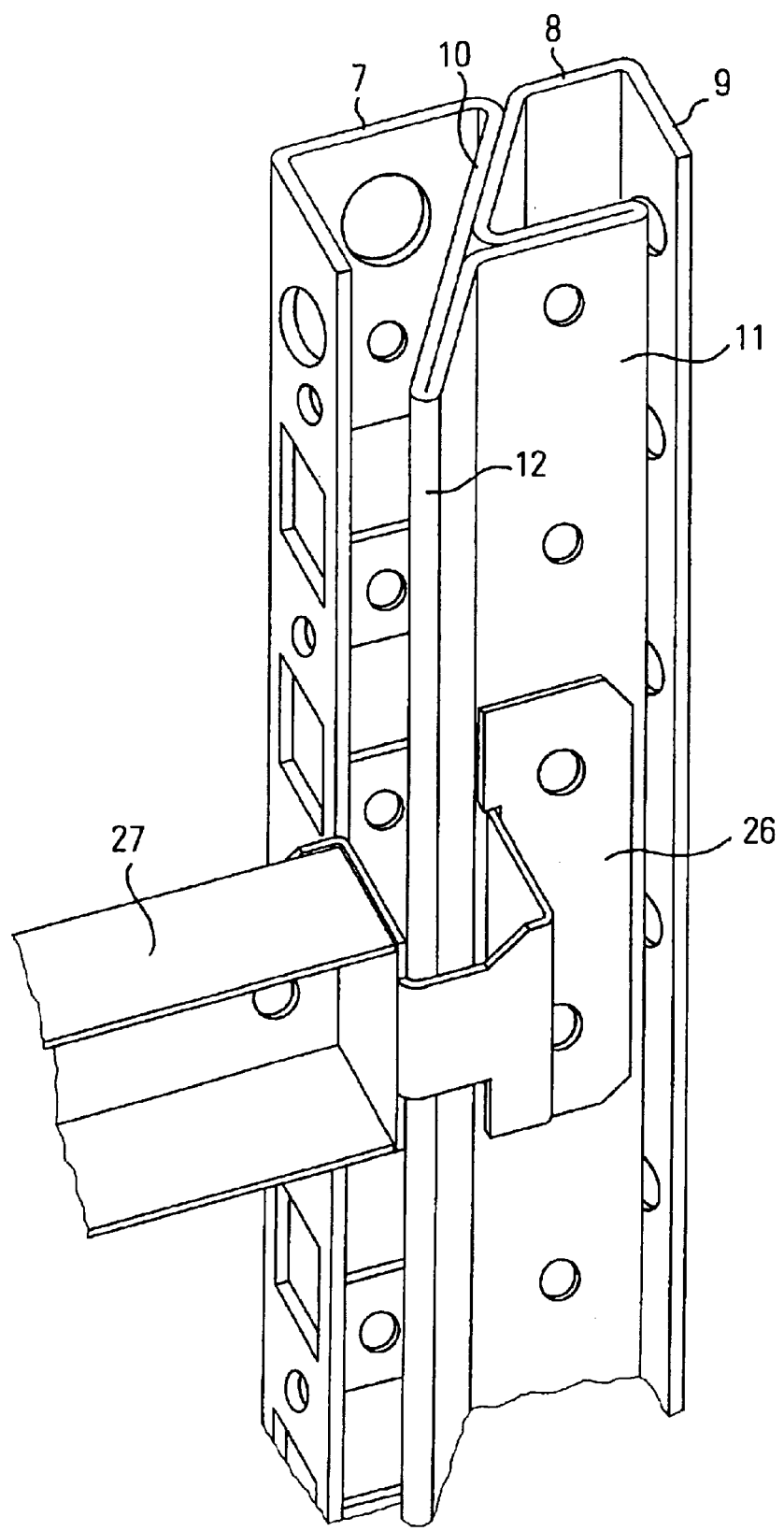
FIG. 6 is a three-dimensional view of the vertical profile shown in FIGS. 1–4 attached to a carrier element.

FIG. 6 illustrates a lateral carrier element 27 in the interior of the switch cabinet and attached to the vertical profile 2. To this end, there is provided a mounting element 26 which connects carrier element 27 to vertical profile 2. In an exemplary embodiment, carrier element 27 includes a U-shaped channel which is oriented with its base surface into the interior of the switch cabinet, so that an open area of the U-shaped channel faces away from the interior of the switch cabinet. A lateral end of carrier element 27 is oriented on vertical profile 2 such that it is arranged in a line relative to or next to profile web 6 between profile web 6 and fold edge 12.

Mounting element 26 is provided for fastening carrier element 27 to vertical profile 2. When viewed in cross section, mounting element 26 has a substantially U-shaped basic body, and both side portions of the body include an outwardly bent edge, the edges being oriented away from one another. Furthermore, one side portion of the body is made slightly longer than the other one. During operation, a bent edge of one side portion of the mounting element body rests on fastening web 11 and is fastened to fastening web 11 via two openings extending therethrough. The U-shaped portion of the mounting element 26 is guided around a free end of the double-walled profile web 10, so that fold edge 12 comes to rest in a corner of the U-shaped basic body of mounting element 26 that faces away from fastening web 11. The second side portion of the mounting element body extends between fold edge 12 and profile web 6 and simultaneously rests on a lateral end of carrier element 27. The bent edge adjoining the mounting element body side portion grips around carrier element 27 and rests from the outside on a basic portion of carrier element 27. Mounting element 26 is fastened to carrier element 27 via an opening which is provided in mounting element 26 and also in carrier element 27.

FIGS. 4 and 5 further illustrate an exemplary lower horizontal profile 3 and an exemplary transverse profile 4 connected to vertical profile 2. Lower transverse profile 4 shall here be described in detail with reference to FIG. 7.

As illustrated in FIG. 5, lower horizontal profile 3 has a contact surface 50 which is provided with a row of openings or holes therethrough and oriented upward towards the interior of the switch cabinet, as well as a profile web 51 which forms an open engagement section extending in a direction perpendicular thereto. Cable 49 running in the cable compartment of vertical profile 2 can thereby be displaced into the engagement section without any obstacles and guided therein. Cable 49 is thereby laid in a simplified way and protected at the same time.

Figure 7:
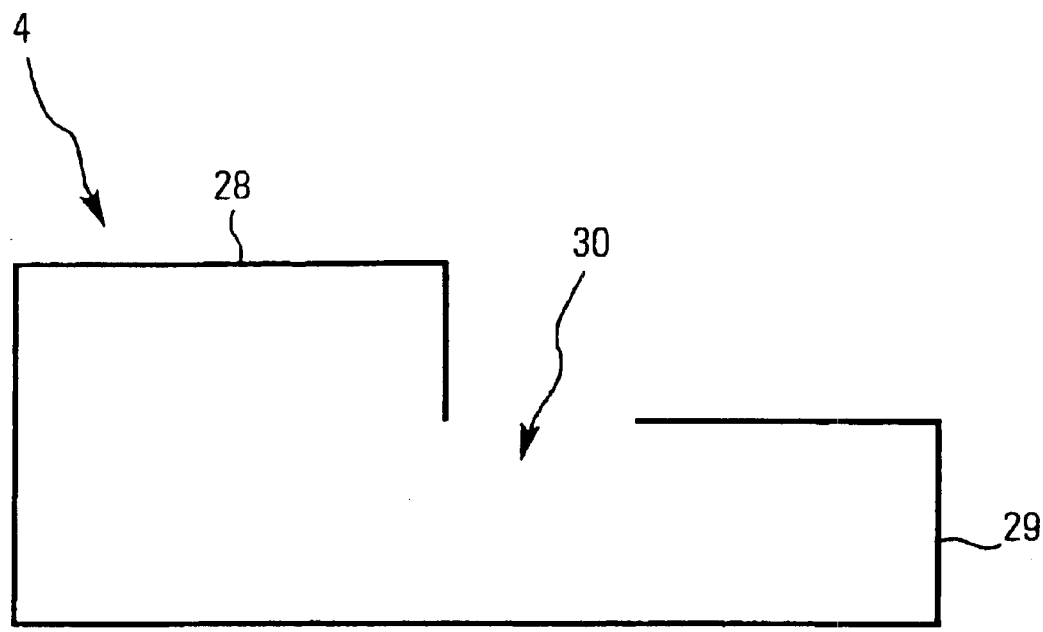
FIG. 7 is a cross-sectional view of a lower lateral transverse profile for the frame structure shown in FIG. 1.

Viewed in cross section, lower transverse profile 4 shall now be explained briefly with reference to FIG. 7 in an exemplary embodiment. Lower transverse profile 4 is also designed as an open profile, and is substantially formed by two U-shaped channels 28, 29 arranged vertically relative to each other. Channels 28, 29 are oriented relative to each other such that the one channel is open towards the bottom side of the switch cabinet and the other is open towards the side facing away from the interior of the switch cabinet, i.e. it is arranged in a lying position. The profile webs of the U-shaped channels 28, 29 that face away from the interior of the switch cabinet are each extended, and the two channels are interconnected via said extended profile webs to form an angle of 90°. The profile web of the U-shaped channel 29 which is arranged in a lying position is here extended such that a slide groove 30 is formed between the two U-shaped channels 28, 29 that are aligned with respect to one another, slide groove 30 being accessible from the interior of the switch cabinet.

A top view of lower transverse profile 4 is also shown in FIGS. 4 and 5, including an arrangement of the rows of holes therethrough relative to one another and illustrating the dimensions of the U-shaped channels 28, 29 in a exemplary embodiment. For instance, in an illustrative embodiment, U-shaped channel 29 includes a bottom surface of a very broad design, as illustrated in a top view, which constitutes a broad contact and fastening surface. By contrast, a side web of the U-shaped channel 28 which is oriented towards the interior of the switch cabinet is of a much smaller design. In the attachment portion towards lower horizontal profile 4, a side web of channel 28 is of a particularly small design and attains its width proper only after a predetermined distance, so that slide groove 30 is of a particularly broad design in an initial portion of the side web of channel 28.

It is contemplated that the various profile webs of the two U-shaped channels 28, 29 can selectively be designed with rows of holes. In one embodiment it has turned out to be of advantage when the profile webs of the downwardly open U-shaped channel 28 that are oriented towards the interior of the switch cabinet are equipped with rows of holes and when the lateral profile web of the lying U-shaped channel 29 which is oriented towards the interior of the switch cabinet comprises rows of holes. Lateral profile webs of the two U-shaped channels 28 and 29 that are each directed towards the interior of the switch cabinet are oriented relative to each other such that the lateral profile web of the lying U-shaped channel 29 extends below the end of the lateral profile web of the U-shaped channel 28.

Figure 8:
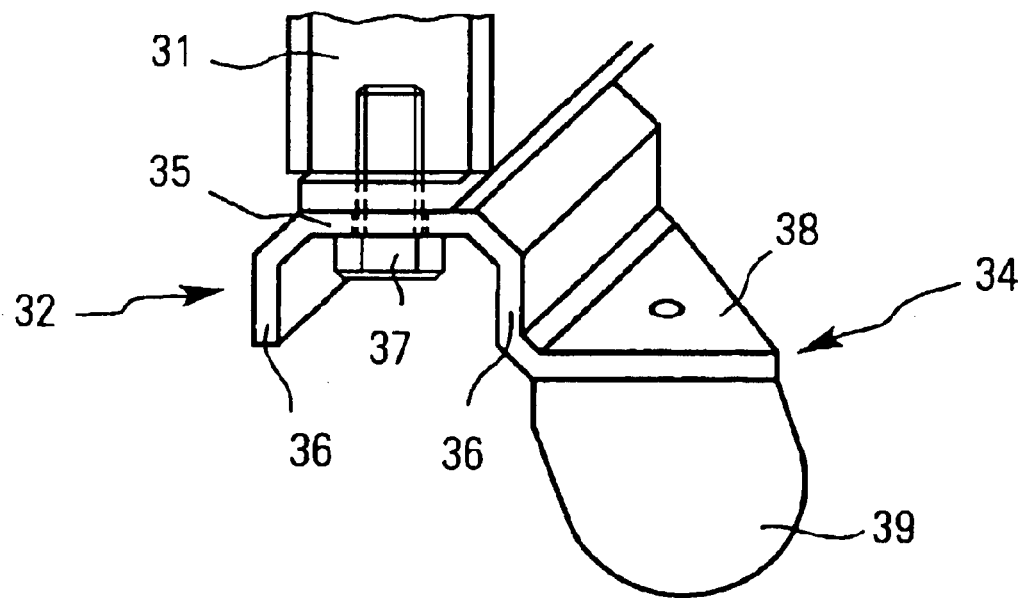
FIG. 8 is a perspective view of a mounting plate for the frame structure shown in FIG. 1.

During use, components, e.g. mounting plate 31, can be inserted into the switch cabinet in parallel with a mounted rear wall. To this end, a mounting plate 31, which is shown in FIG. 8, includes at a lower end thereof spaced-apart slide feet 32 via which the mounting plate is inserted into the switch cabinet.

Slide feet 32 include a U-profile 33 and an angle plate 34 arranged at the side thereof and extending sideways and downwards. The U-profile is here composed in detail of the U-web 35 and two adjoining U-legs 36. In the assembled state, U-web 35 rests on the bottom side of the mounting plate 31, the U-leg extending in the direction facing away from the mounting plate as an extension of the side surfaces of the mounting plate 31. Furthermore, a threaded hole is provided in the U-web 35, so that the U-web 35 can be fastened via a screw 37 to mounting plate 31.

Angle plate 34 is arranged at an end of a U-leg 36. In an exemplary embodiment, angle plate 34 is integrally formed with the U-profile 33. In detail, angle plate 34 comprises an upper plate element 38 which is of a triangular configuration and the longer side surface thereof is formed by the U-leg 36. A leg plate 39 extends from the shorter side leg of the plate element 38 downwards at an angle of about 90°. Leg plate 39 is here provided at an end facing away from U-profile 33 with a profile designed as a circular section. Leg plate 39 is introduced into slide groove 30 of lower transverse profile 4 while mounting plate 31 is being inserted, and is displaced in slide groove 30 to the desired position.

An insertion process of mounting plates 31 is illustrated with reference to FIG. 9 which shows two different phases of inserting mounting plates 31. Each mounting plate 31 has in general a rather heavy weight because it must be designed such that it is sufficiently stable to carry different components. Handling of mounting plates 31 is thereby aggravated extraordinarily. For inserting a mounting plate 31 into frame structure 1 (shown n FIG. 1), plate 31 is lifted into the interior of the switch cabinet and is inserted with its slide feet 32 at both sides into slide grooves 30 of transverse profiles 4 extending in parallel with each other. To transport mounting plate 31 into its desired position, plate 31 is tilted forwards i.e. away from rear wall 16, so that it is only seated on the rounded edge of leg plate 39. The mounting plate 31 is now moved in the insertion direction E in slide groove 30 toward rear wall 16. Thanks to the rounded design of leg plate 39, mounting plate 31 can be displaced almost without any problems. At the same time mounting plate 31 is fixed by the slide grooves 30 provided at both sides, so that any jamming of the mounting plate 31 is excluded.

Figure 10:
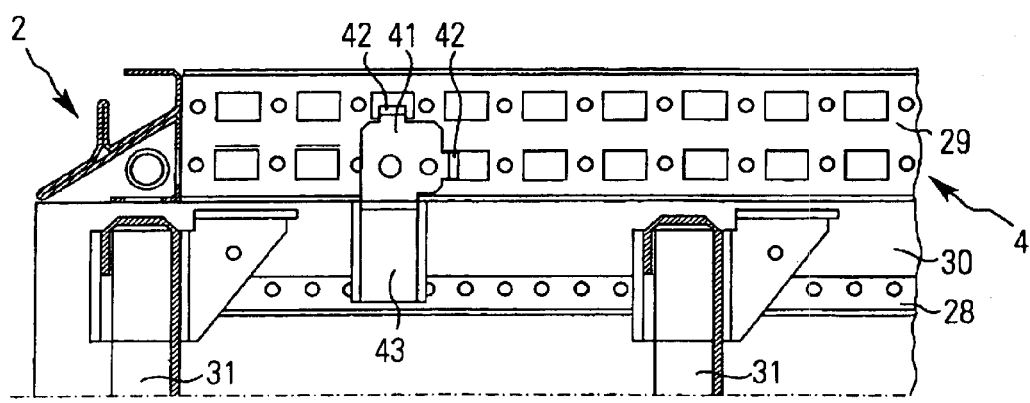
FIG. 10 is a top view of the lower transverse profile attached to a receiving member and a mounting plate.

To fix and fasten mounting plate 31 in a desired position, a receiving element 40 is arranged in an area of lower transverse profile 4 in a direction transverse to the insertion direction. Prior to installation of mounting plate 31 in an interior of the switch cabinet, receiving element 40 is fastened at a position intended for mounting plate 31. To this end receiving element 40 in an illustrative embodiment includes a fastening element 41 (shown in FIG. 10) which has a substantially rectangular outer shape and is arranged on the bottom portion of U-shaped channel 28 of transverse profile 4 which is provided with two rows of openings or holes extending in parallel with one another. Fastening element 41 includes two side surfaces with engagement elements 42 which extend downwards at an angle of about 90°, each engaging into a hole of the rows of holes in transverse profile 4 extending in parallel with one another. The engagement elements 42 extend vertically, thereby permitting a fixation of the fastening element 41 at two vertical sides. In addition, fastening element 41 includes two openings via which fastening element 41 can be attached to U-shaped channel 29.

In an illustrative embodiment fastening element 41 is slightly longer at a side edge extending in parallel with slide groove 30 than a corresponding surface of U-shaped channel 29. This portion projecting beyond the U-shaped channel 29 has arranged thereon at its bottom side a receiving web 43 which extends in a direction transverse to the slide groove 30 up to and beyond the side of U-shaped channel 29 which is oriented towards the interior of the switch cabinet. When viewed in cross section, receiving web 43 is equipped with a downwardly opened U-shaped profile which extends in an area of the slide groove 30 up to the bottom.

Since during installation of mounting plates 31 it is very difficult to view the lower end of the mounting plate, an abutment of slide feet 32 with a lower side of the plate element 38 on receiving element 40 indicates that the intended position has been reached. Subsequently, mounting plate 31 is pivoted towards rear wall 16. During this process U-profile 33 of slide foot 32 grips automatically around receiving web 43 arranged in a direction transverse to slide groove 30, thereby positioning mounting plate 31 in the desired position. The U-legs 36 rest at both sides on receiving web 43.

Figure 9:
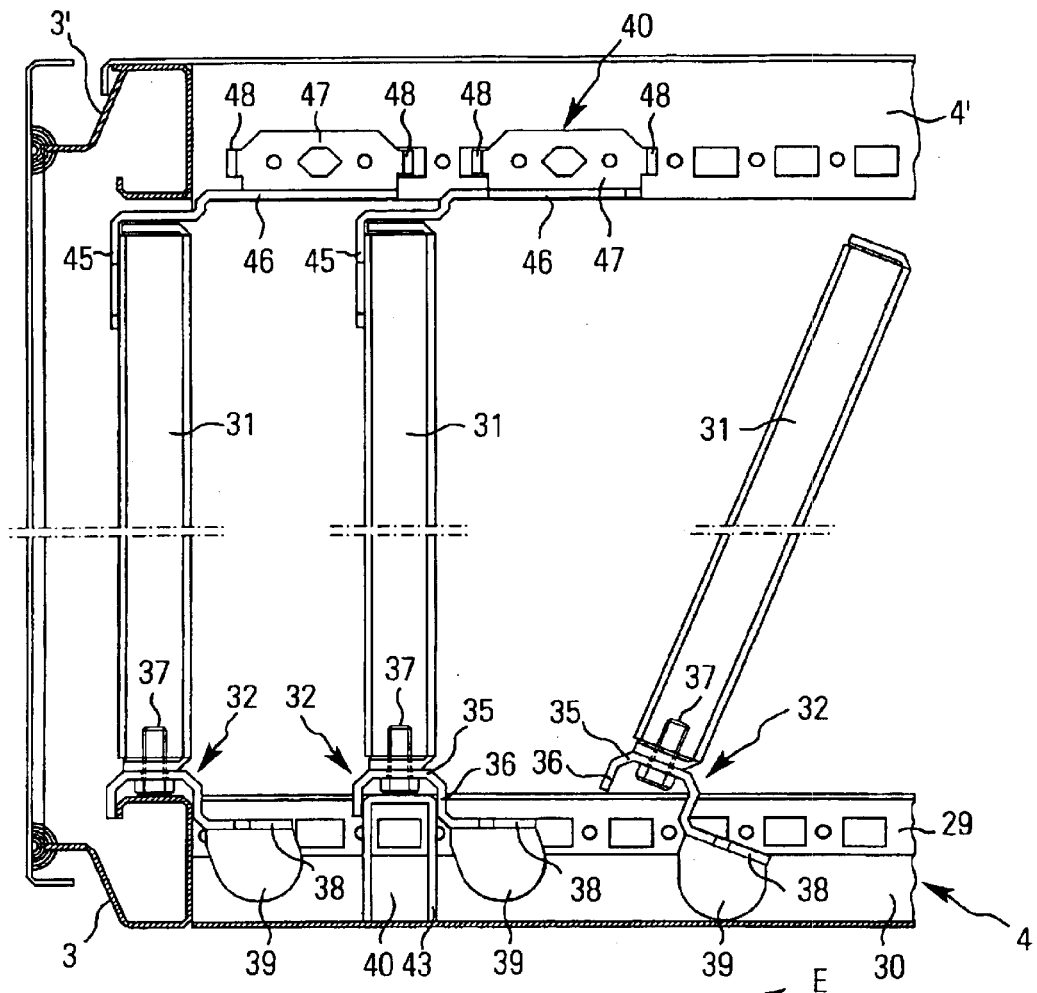
FIG. 9 is a view of the upper and lower transverse profile of the frame structure shown in FIG. 1, illustrating insertion of a mounting plate into the switch cabinet.

As is also shown in FIG. 9, dimensions of lower horizontal webs 3 have been chosen such that slide feet 32 can also be positioned on a U-shaped portion extending towards the interior of the switch cabinet. It is thereby possible to mount a mounting plate 31 particularly close to rear wall 16.

For additionally fixing mounting plates 31, plates 31 are also fastened in respective upper portions to an upper transverse profile 4'. In an illustrative embodiment a fixing element 44 is used for fastening an upper edge portion of the mounting plate 31. Fixing element 44 includes two legs 45, 46 positioned substantially at a right angle relative to each other. Leg 45 includes a receiving opening via which fixing element 44 can be connected to a mounting plate 31. A bent section 47 is bent upwards at a right angle from leg 46 via a rear section. Bent section 47 can be connected via installed receiving openings to a row of holes of upper transverse profile 4' that are designed accordingly. Bent section 47 further includes additional engagement elements 48, each engaging into rectangular holes of the row of holes of the transverse profile.

Preferably, fixing element 44 is mounted in the interior of the switch cabinet prior to the installation of mounting plates 31. During installation of mounting plates 31, in particular during tilting each plate 31 into the end position, each respective leg 45 simultaneously exerts the function of an abutment plate which contributes to an additional exact positioning of the mounting plate. Leg 46 of fixing element 44 may be provided with a step for ensuring, on the one hand, an abutment on upper transverse profile 4' and, on the other hand, an abutment on an upper side of mounting plate 31.

While the invention has been described in terms of various specific embodiments, those skilled in the art will recognize that the invention can be practiced with modification within the spirit and scope of the claims.

What is claimed is:

1. A frame structure for a switch cabinet, said frame structure comprising at least four vertically extending rail profiles; and at least one of said vertical rail profiles comprising:
a cross section formed by a plurality of bent profile webs, the bent profile webs of the cross section fitting within an imaginary rectangular envelope defined by a plurality of edges forming a perimeter of said envelope, at least some of the bent profile webs coincident with one of said perimeter edges of the rectangular envelope;

said at least one vertical rail profile configured to be open; and at least one double walled profile web extending for a length which is greater than a length of one of the perimeter edges of the rectangular envelope.

2. A frame structure in accordance with claim 1, wherein said length of said double-walled profile web is greater than a length of each of said perimeter edges of said rectangular envelope.

3. A frame structure in accordance with claim 1 wherein said perimeter is substantially square.

4. A frame structure in accordance with claim 1 wherein said double-walled profile web subdivides said at least one vertical rail profile into a section facing an interior of said switch cabinet in the mounted state and into a section facing away from the interior of said switch cabinet in the mounted state.

5. A frame structure in accordance with claim 1 wherein said at least one vertical rail profile in cross section comprises a first pair of profile webs positioned at an angle relative to each other and forming an edge of said rail profile facing an interior of said switch cabinet in the mounted state, and said cross section further comprises a second pair of profile webs positioned at an angle relative to each other and forming an edge of said rail profile facing away from the interior of said switch cabinet in the mounted state.

6. A frame structure in accordance with claim 5 wherein said profile webs of each of said first and second pairs of profile webs are positioned at about a 90° angle relative to one another.

7. A frame structure in accordance with claim 5 wherein, when viewed in cross section, the angles enclosed between the first and second pair of profile webs define adjacent corners of said rectangular envelope and also define a section of a single side wall of said at least one vertical rail profile.

8. A frame structure in accordance with claim 5 wherein, when viewed in cross section, said double-walled profile web extends between the first and second pair of said profile webs up to a corner of said envelope, said corner being adjacent the first pair of profiled webs facing the interior of said switch cabinet.

9. A frame structure in accordance with claim 8 wherein each wall of said double-walled profile web is connected to a respective one of said first and second pairs of profiled webs.

10. A frame structure in accordance with claim 1, some of said profile webs defining a side wall of said vertical rail profile, said double-walled profile web integrally formed with said profile webs defining said side wall.

11. A frame structure in accordance with claim 9 wherein, when viewed in cross section, said double-walled profile web extends from said side wall at an angle of about 60° from the side wall.

12. A frame structure in accordance with claim 1 further comprising a laterally projecting fastening web formed on said double-walled profile web.

13. A frame structure in accordance with claim 12 wherein said laterally projecting fastening web extends substantially parallel to one of the perimeter edges of the rectangular envelope.

14. A frame structure in accordance with claim 13 wherein said laterally projecting fastening web extends in a direction facing away from an interior of said switch cabinet in a mounted state.

15. A frame structure in accordance with claim 12 wherein said lateral fastening web is double-walled.

16. A frame structure in accordance with claim 1 wherein one of said profile webs faces an interior of said switch cabinet in a mounted state, said profile web facing the interior of said switch cabinet extending about half a length of the corresponding perimeter edge length of said rectangular envelope.

17. A frame structure in accordance with claim 1, wherein some of said profile webs define a side wall of said vertical profile rail, each of said profile webs which define said side wall having a different length extending along one of said perimeter edges of the rectangular envelope, an innermost one of said profile webs which define said side wall extending toward the interior of said switch cabinet in a mounted state being longer than an outermost one of said profile webs which define said side wall extending away from an interior of said switch cabinet in a mounted state.

18. A frame structure in accordance with claim 1, wherein said plurality of bent profile webs includes a first profile web and a second profile web which define a single side wall of said vertical rail profile, said first profile web and said second profile web having a length ratio of about 2/1.

19. A frame structure in accordance with claim 1 wherein one of said profile webs extends toward an exterior of the switch cabinet in a mounted state, said profile web extending toward the exterior being less than half as long as a corresponding perimeter edge length of said rectangular envelope.

20. A frame structure in accordance with claim 19 wherein said profile extending toward the exterior of said switch cabinet has a length about ⅓ of the corresponding perimeter edge of said rectangular envelope.

21. A frame structure in accordance with claim 5, wherein said second pair of profile webs have an approximately equal length.

22. A frame structure in accordance with claim 12 wherein some of said profile webs define a side wall of said vertical rail profile, said side wall including a first profile web having a first length and a second profile web having a second length which is less than said first length, said lateral fastening web having a third length greater than said second length and less than said first length.

23. A frame structure in accordance with claim 5 wherein said first pair of profile webs are each provided essentially over their whole length with at least one row of holes.

24. A frame structure in accordance with claim 23 wherein said at least one row of holes includes alternating round and rectangular holes.

25. A frame structure in accordance with claim 12 wherein said lateral fastening web is longitudinally provided with at least one row of holes.

26. A frame structure in accordance with claim 12 wherein said lateral fastening web is oriented away from an interior of said switch cabinet in a mounted state, said lateral fastening web longitudinally provided with at least one row of holes.

27. A frame structure in accordance with claim 12, wherein said double-walled profile web and said double-walled fastening web are each formed by folding two wall sections of said profile webs onto one other.

28. A frame structure in accordance with claim 1 wherein said at least one said vertical rail profile is integrally made from sectional steel.

29. A frame structure in accordance with claim 1 further comprising at least one horizontal profile designed as an open profile.

* * * * *